(12) United States Patent
Ibikunle et al.

(10) Patent No.: US 11,836,550 B2
(45) Date of Patent: Dec. 5, 2023

(54) SYSTEMS AND METHODS FOR MOVING, RECONCILING, AND AGGREGATING DATA FROM MAINFRAME COMPUTERS TO HYBRID CLOUD

(71) Applicant: JPMORGAN CHASE BANK, N.A., New York, NY (US)

(72) Inventors: Tayo Ibikunle, Haverford, PA (US); Vishnuvardhan Pondugula, Garnet Valley, PA (US); Mizan Miah, Wilmington, DE (US); Howard Spector, Street, MD (US); Ashok Reddy, Newark, DE (US); Arun Subramanian, Newark, DE (US); Raghu Vudathu, Downingtown, PA (US); Anupam Arora, Middletown, DE (US)

(73) Assignee: JPMORGAN CHASE BANK , N.A., New York, NY (US)

( * ) Notice: Subject to any disclaimer, the term of this patent is extended or adjusted under 35 U.S.C. 154(b) by 55 days.

(21) Appl. No.: 17/657,674

(22) Filed: Apr. 1, 2022

(65) Prior Publication Data
US 2023/0315546 A1 Oct. 5, 2023

(51) Int. Cl.
G06F 9/44 (2018.01)
G06F 9/54 (2006.01)
G06F 16/25 (2019.01)
G06F 16/27 (2019.01)

(52) U.S. Cl.
CPC ............ *G06F 9/546* (2013.01); *G06F 16/258* (2019.01); *G06F 16/273* (2019.01)

(58) Field of Classification Search
CPC ....................................................... G06F 9/546
USPC .......................................................... 719/313
See application file for complete search history.

(56) References Cited

U.S. PATENT DOCUMENTS

| | | | |
|---|---|---|---|
| 2017/0206245 A1* | 7/2017 | Zhang | G06F 9/4552 |
| 2018/0276289 A1* | 9/2018 | Gross | G06F 16/24556 |
| 2023/0153279 A1* | 5/2023 | Glass | H04L 69/18 |
| | | | 707/634 |

* cited by examiner

*Primary Examiner* — Timothy A Mudrick
(74) *Attorney, Agent, or Firm* — GREENBERG TRAURIG LLP

(57) ABSTRACT

Systems and methods for moving, reconciling, and aggregating data from mainframe computers to hybrid cloud are disclosed. A method may include: a mainframe computer program receiving a trigger event; the mainframe computer program generating a message comprising data from one of a plurality of logical partitions in the mainframe computer program; the mainframe computer program loading the message to a message log database; the mainframe computer program sending the message to a cloud-based target database by making an asynchronous call with the message to a messaging service, wherein a cloud-based listener receives the message from the messaging service and writes the data from the message to the cloud-based target database; a message purge/retransmission service computer program receiving an acknowledgement message that the data in the message was successfully written to the cloud-based target database; and the message purge/retransmission service computer program purging the message from the message log database.

19 Claims, 3 Drawing Sheets

SYSTEMS AND METHODS FOR MOVING, RECONCILING, AND AGGREGATING DATA FROM MAINFRAME COMPUTERS TO HYBRID CLOUD

BACKGROUND OF THE INVENTION

1. Field Of The Invention

Embodiments generally relate to systems and methods for moving, reconciling, and aggregating data from mainframe computers to hybrid cloud.

2. Description of the Related Art

As data is moved from a mainframe computer to a hybrid cloud environment, there is a risk that customer data will be lost in transmission, or that data will be duplicated. Further, it is desirable to know that the data came from an authentic source.

SUMMARY OF THE INVENTION

Systems and methods for moving, reconciling, and aggregating data from mainframe computers to hybrid cloud are disclosed. In one embodiment, a method for moving, reconciling, and aggregating data from mainframe computers to hybrid cloud may include: (1) receiving, by a mainframe computer program executed by a mainframe computer, a trigger event; (2) generating, by the mainframe computer program, a message comprising data from one of a plurality of logical partitions in the mainframe computer program; (3) loading, by the mainframe computer program, the message to a message log database; (4) sending, by the mainframe computer program, the message to a cloud-based target database by making an asynchronous call with the message to a messaging service, wherein a cloud-based listener receives the message from the messaging service and writes the data from the message to the cloud-based target database; (5) receiving, by a message purge/retransmission service computer program executed by the mainframe computer program, an acknowledgement message that the data in the message was successfully written to the cloud-based target database; and (6) purging, by the message purge/retransmission service computer program, the message from the message log database.

In one embodiment, the trigger event may include an event trigger, a replication/real-time trigger, or a batch trigger.

In one embodiment, the message may also include a message creation timestamp, and the message purge/retransmission service computer program purges the message with the message creation timestamp from the message log database.

In one embodiment, the message may include a JSON message or a Kafka message.

According to another embodiment, a method for moving, reconciling, and aggregating data from mainframe computers to hybrid cloud may include: (1) receiving, by a mainframe computer program executed by a mainframe computer, a trigger event; (2) generating, by the mainframe computer program, a message comprising data from one of a plurality of logical partitions in the mainframe computer program; (3) loading, by the mainframe computer program, the message to a message log database; (4) sending, by the mainframe computer program, the message to a cloud-based target database by making an asynchronous call with the message to a messaging service, wherein a cloud-based listener receives the message from the messaging service and writes the data from the message to the cloud-based target database; (5) receiving, by a message purge/retransmission service computer program executed by the mainframe computer program, a message that the data in the message was not successfully written to the cloud-based target database, or after the message purge/retransmission service computer program detects passage of a predetermined amount of time; and (6) triggering, by the message purge/retransmission service computer program, the logical partition to resend the message.

In one embodiment, the trigger event may include an event trigger, a replication/real-time trigger, or a batch trigger.

In one embodiment, the message may also include a message creation timestamp, and the message purge/retransmission service computer program purges the message with the message creation timestamp from the message log database.

In one embodiment, the message may include a JSON message or a Kafka message.

In one embodiment, the mainframe computer program may trigger the logical partition to resend the message.

According to another embodiment, a method for moving, reconciling, and aggregating data from mainframe computers to hybrid cloud may include: (1) receiving, by a mainframe computer program executed by a mainframe computer, a trigger event; (2) generating, by the mainframe computer program, a message comprising data from one of a plurality of logical partitions in the mainframe computer program; (3) receiving, by the mainframe computer program, a sequential identifier for the message, wherein the sequential identifier identifies a sequence of the message in a plurality of messages; (4) loading, by the mainframe computer program, the message with the sequential identifier to a message log database; (5) sending, by the mainframe computer program, the message and the sequential identifier to a cloud-based target database by making an asynchronous call with the message to a messaging service, wherein a cloud-based listener receives the message from the messaging service and writes the data from the message to the cloud-based target database; (6) determining, by the cloud-based listener and based on the sequential identifier, that a prior message is missing and informing, by the cloud-based listener, that the prior message is missing; and (7) triggering, by a message purge/retransmission service computer program, the logical partition to resend the message.

In one embodiment, the trigger event may include an event trigger, a replication/real-time trigger, or a batch trigger.

In one embodiment, the sequential identifier may include a sequential hash key.

In one embodiment, the sequential identifier may include an identifier for the logical partition.

In one embodiment, the sequential identifier may include a portion of the data.

In one embodiment, the cloud-based listener may determine that a prior message is missing by polling the target database for sequential identifiers for successfully written messages and identifying a missing sequential identifier.

In one embodiment, the cloud-based listener may determine that a prior message is missing by retrieving a last successfully stored message and determining that a sequential identifier for the last successfully stored message is not sequential with the sequential identifier for the message.

In one embodiment, the last successfully stored message may be updated with each successfully stored message.

In one embodiment, the message may include a JSON message or a Kafka message.

In one embodiment, the mainframe computer program may trigger the logical partition to resend the message.

BRIEF DESCRIPTION OF THE DRAWINGS

For a more complete understanding of the present invention, the objects and advantages thereof, reference is now made to the following descriptions taken in connection with the accompanying drawings in which.

DETAILED DESCRIPTION OF PREFERRED EMBODIMENTS

Embodiments are directed to systems and methods for moving, reconciling, and aggregating data from mainframe computers to hybrid cloud.

Embodiments may leverage a combination of a feedback loop and a sequential identifier, such as a sequential hash key, to ensure safe movement of data from a mainframe system to the hybrid cloud. For example, a sending system, such as a mainframe that is originating the transmission of data, may send data to a receiving system, such as a cloud application that may receive and stored the data. In order to ensure that the data successfully moves from the sending system to the receiving system, a unique sequence identifier may be attached to each message being transmitted, and the message may travel through several transport mechanisms, for example, MQ and Kafka, to cross into the cloud. Once the message is received at the target and storage is confirmed, the receiving system may transmit an acknowledgement back to the sending system. Only when the sending system has received the acknowledgement is the data removed from the sending system's storage. The sending system may monitor the status of all data sent, and if the acknowledgement has not been received within a certain time, it may attempt to resend that data.

In embodiments, to ensure that the data is received by the receiving system only once, is not missing any parts, and is from an authentic source, a hash of the data to be transmitted may be computed and signed by the sending system with a digital signature. An immutable block of data may be created using the hash and digital signature and may be written to a distributed ledger, such as a blockchain. Any intermediate systems that may add or modify the data may add a hash of a block and digital signatures to the message.

The receiving system may read the blocks from the distributed ledger, may validate the digital signatures, may compute the hash(e), and may match the hash(es) with the signed hash(se). This ensures authenticity and non-tampering.

The receiving system may then combine the blocks of data as instructed by each block and may store the combined blocks in the target system.

Figure 1:
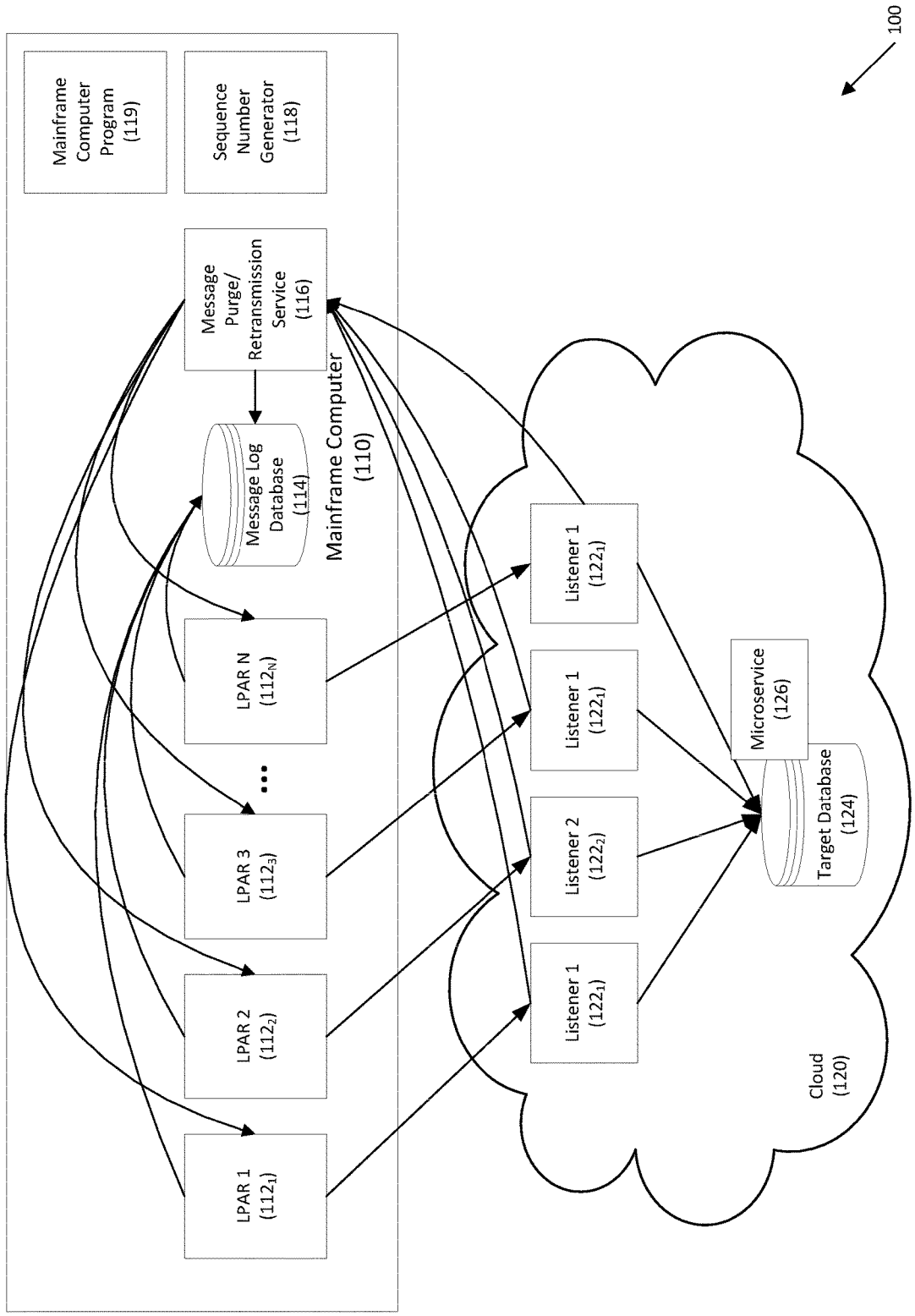
FIG. 1 depicts a system for moving, reconciling, and aggregating data from mainframe computers to hybrid cloud according to an embodiment.

Referring to FIG. 1, a system for moving, reconciling, and aggregating data from a mainframe computer to a hybrid cloud is provided according to an embodiment. System 100 may include mainframe computer 110. Mainframe computer 110 may include a plurality of logical partitions (LPARs), such as LPAR 1 ($112_1$), LPAR 2 ($112_2$), LPAR 3 ($112_3$), . . . LPAR N ($112_N$). Mainframe computer 110 may also include message log database 114, and message purge/retransmission service 116. Message log database 114 may store a record of messages sent by LPARs 112 to cloud 120, and message purge/retransmission service 116 may receive communications from cloud 120 and may purge messages confirmed as received from message log database 114. If no confirmation is received, message purge/retransmission service 116 may cause the LPAR 112 that sent the unconfirmed message to re-send the message.

Mainframe 110 may execute mainframe computer program 119 that may be a computer program, a process, a script, etc. that generates a message to identify data to send to cloud 120 for storage. The computer program, process, or script may generate a message appropriate for a messaging service and may include the identified data in the message.

In one embodiment, the message may be generated by an event trigger, by a replication/real-time trigger, or by a batch trigger. For example, an event trigger may be used when a particular action is invoked on an account, a mainframe computer process may generate an event that is placed on a messaging system. A replication/real-time trigger may be a database level trigger where any change in the data causes a message to be placed on the messaging system. And a batch trigger may be used for batch migration of data to load to target database 124 after the completion of a batch process.

Mainframe computer 110 may further include sequence number generator 118 that may generate sequence numbers (e.g., a sequential hash key) for messages. In one embodiment, sequence number generator 118 may be a computer program, a script, a sequence generating table that ensures unique numbers across all LPAR's that are generating messages, etc. In one embodiment, sequence number generator 118 may be provided as part of mainframe computer program 119.

The data may be provided to a client or another system, may be backed up to target database 124, etc.

In one embodiment, each LPAR 122 may send the message to message log database 114 indicating that the message has been sent to cloud 120. In one embodiment, the message may include the data.

Cloud 120 may include a plurality of listeners 122, such as listener 1 ($122_1$), listener 2 ($122_2$), listener 3 ($122_3$), . . . listener N ($122_N$). Each listener 122 may receive messages from one or more LPAR 112 and may communicate the message to target database 124, which may store data from LPARs 112.

Listeners 122 may receive acknowledgement messages from target database 124 that acknowledge the receipt and writing of the data in a message to target database 124. For example, microservice 126 may provide the acknowledgement messages to listeners 122. Listeners 122 may also return the acknowledgement to message purge/retransmission service 116, which may then purge the message associated with the acknowledgement from message log database 114.

Figure 2:
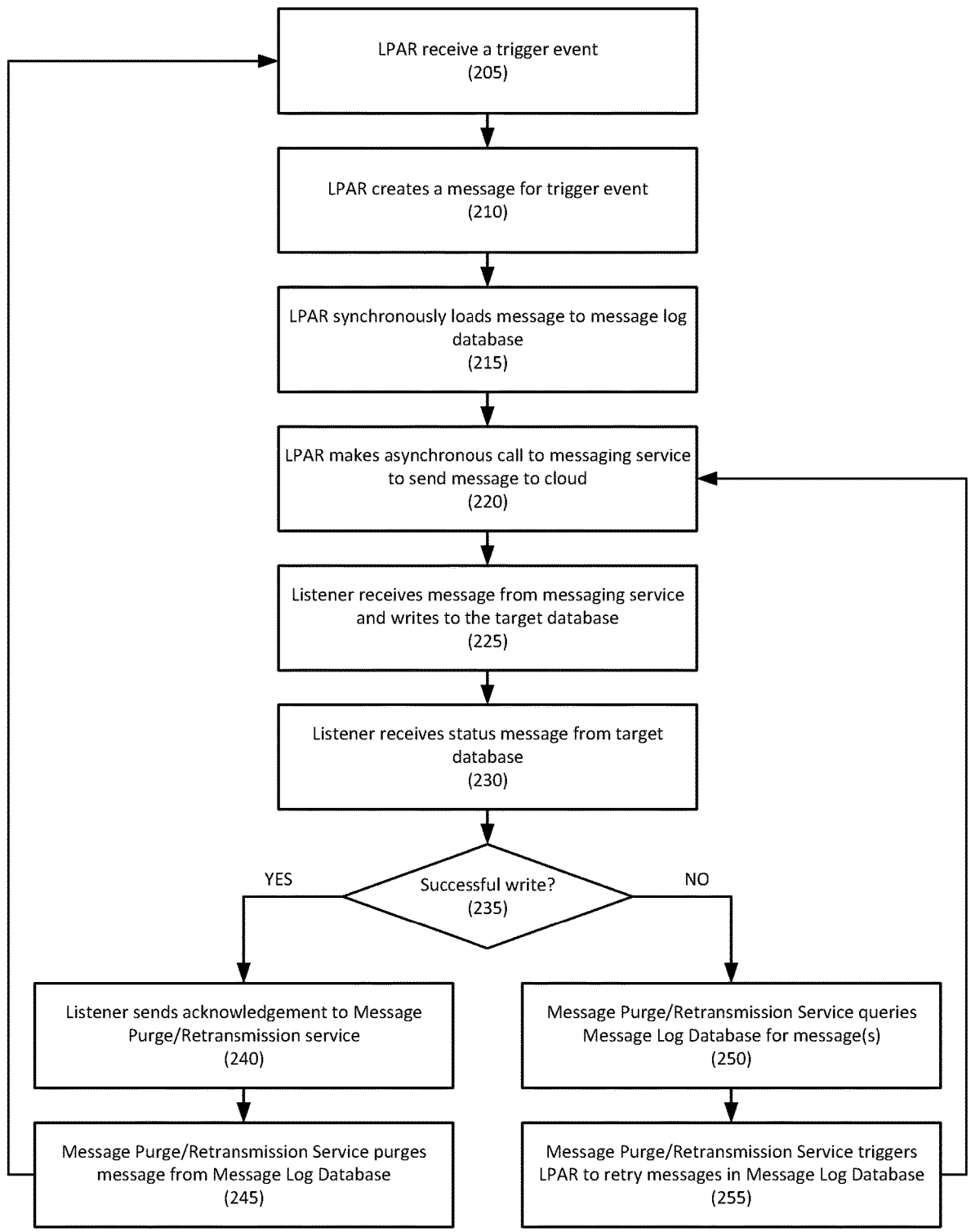
FIG. 2 depicts a method for moving, reconciling, and aggregating data from mainframe computers to hybrid cloud according to an embodiment.

Referring to FIG. 2, a method for moving, reconciling, and aggregating data from a mainframe computer to a hybrid cloud is provided according to an embodiment. In one embodiment, the method of FIG. 2 may be executed by one or more mainframe computer programs executed by the mainframe computer.

In step 205, a mainframe computer program executed by a mainframe computer may receive a trigger event that causes a LPAR to transfer data to a cloud-based target database. In one embodiment, the message may be generated by an event trigger, by a replication/real-time trigger, by a batch trigger, etc.

In step 210, the mainframe computer program may create a message in response to the trigger event. In one embodiment, the message may include data to transfer to a cloud-based target database.

In one embodiment, the message may be formatted for a messaging service, such as MQ (e.g., in JSON format), Kafka (e.g., in Apache AVRO format), etc. In one embodiment, the message may include a message creation timestamp that may be used to track latency in data transmission and in case of duplicates determine the latest information. It may also be used by the message purge/retransmission service to identify messages to purge or retransmit.

In step 215, the LPAR may synchronously load the message to a message log database. The message log database may then store the message.

In step 220, the LPAR may make an asynchronous call to a messaging service to send the message to the cloud-based target database. For example, the LPAR may send the message to a messaging system.

In step 225, a listener in the cloud, which may be part of the messaging service, may receive the message and may provide the message to a target database. In one embodiment, a microservice or similar may write the data from the message to the target database.

In step 230, the listener may receive a status message from the target database. In one embodiment the listener may only receive a status message upon a successful write. If, in step 235, the was successful, in step 240, the listener may send an acknowledgement to the message purge/retransmission service. In step 245, the message purge/retransmission service may purge the related message from the message log database.

If, in step 235, the write was unsuccessful (e.g., a message indicating that the write was unsuccessful), or after the passage of a predetermined amount of time, periodically, etc. in step 250, the message purge/retransmission service may query the message log database for any messages that have not been purged. If there are messages present in the message log database, in step 255, the message purge/retransmission service may trigger the LPARs associated with the messages to resend the corresponding messages to the messaging service. In another embodiment, the message purge/retransmission service may resend the message by submitting the message to the messaging system.

Figure 3:
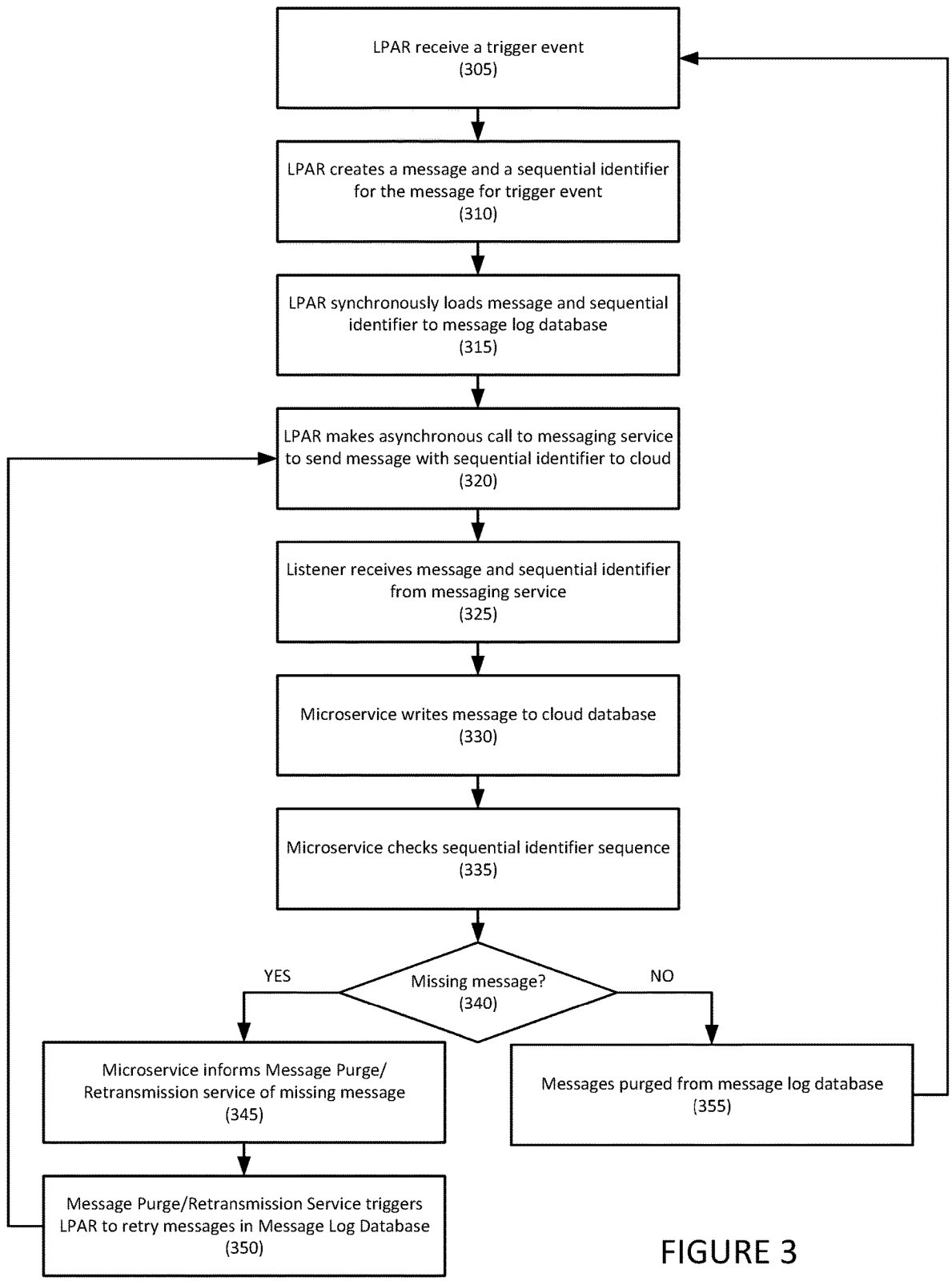
FIG. 3 depicts a method for moving, reconciling, and aggregating data from mainframe computers to hybrid cloud according to another embodiment.

Referring to FIG. 3, a method for moving, reconciling, and aggregating data from a mainframe computer to a hybrid cloud is provided according to another embodiment. In one embodiment, the method of FIG. 3 may be executed by one or more mainframe computer programs executed by the mainframe computer.

In step 305, a LPAR that is part of a mainframe computer may receive a trigger event that causes the LPAR to transfer data to a cloud-based target database. This may be similar to step 205, above.

In step 310, the LPAR may create a message and a sequential identifier for the message for trigger event. In one embodiment, the sequential identifier may indicate a sequence of the message, and with each message, a value of the sequential identifier may increase by a certain amount, such as 1. For example, the sequence numbers may be generated by a sequence number generator. The mainframe computer program may append the sequential identifier to the message. In one embodiment, the message may include data to transfer to a cloud-based target database.

In one embodiment, the sequential identifier may be a sequential hash key that may include an LPAR identifier that indicates that the LPAR from which the data is being sent, a hash of the data in the message, etc. For example, certain digits from the data (e.g., last four digits of a card, an app identifier, etc.) may be included to provide a link between the sequential identifier and the data.

In step 315, the LPAR may synchronously load the message and the sequential identifier to a message log database.

In step 320, the LPAR may make an asynchronous call to a messaging service to send the message and the sequential identifier to a cloud-based target database.

In step 325, a listener in the cloud, which may be part of the messaging service, may receive the message and the sequential identifier from the messaging service, and, in step 330, may write the message to a target database. In one embodiment, a microservice or similar may write the data in the message to the target database.

In one embodiment, the last successfully stored data record may be stored with its sequential identifier for later retrieval by the microservice or similar computer program or script. The last successfully stored data record may be stored in a file, and may be updated with each successfully stored data record.

In step 335, the microservice or similar computer program or script may check the target database to see if there are any missing the sequential identifiers that would indicate missing messages. For example, the microservice may poll the target database with the sequential identifier for the current message to identify any missing sequential identifiers. In another embodiment, the microservice may retrieve the last successfully stored data record and determine if the sequential identifier for the current message indicates a missing message. Any other suitable manner in determining whether there are any missing messages may be used as is necessary and/or desired.

In step 340, if the microservice determines that one or more messages is missing, in step 345, the microservice may inform the message purge/retransmission service of the missing message(s). For example, the microservice may identify the missing sequential identifiers for the message purge/retransmission service.

In step 350, the message purge/retransmission service may trigger the LPARs associated with the messages to resend the corresponding messages to the messaging service.

If, in step 340, there are no missing messages, in step 355, messages may be purged from the message log database at regular intervals, at end of day processing, after the passage of a predetermined amount of time, on demand, etc. The process may return to step 305.

If it is not time to purge the messages, the process may continue to step 305.

Although several embodiments have been disclosed, the embodiments are not exclusive, and features disclosed in one embodiment may be used with other embodiments.

Hereinafter, general aspects of implementation of the systems and methods of embodiments will be described.

Embodiments of the system or portions of the system may be in the form of a "processing machine," such as a general-purpose computer, for example. As used herein, the term "processing machine" is to be understood to include at least one processor that uses at least one memory. The at least one memory stores a set of instructions. The instructions may be either permanently or temporarily stored in the memory or memories of the processing machine. The processor executes the instructions that are stored in the memory or memories in order to process data. The set of instructions may include various instructions that perform a particular task or tasks, such as those tasks described above. Such a set of instructions for performing a particular task may be characterized as a program, software program, or simply software.

In one embodiment, the processing machine may be a specialized processor.

In one embodiment, the processing machine may be a cloud-based processing machine, a physical processing machine, or combinations thereof.

As noted above, the processing machine executes the instructions that are stored in the memory or memories to process data. This processing of data may be in response to commands by a user or users of the processing machine, in response to previous processing, in response to a request by another processing machine and/or any other input, for example.

As noted above, the processing machine used to implement embodiments may be a general-purpose computer. However, the processing machine described above may also utilize any of a wide variety of other technologies including a special purpose computer, a computer system including, for example, a microcomputer, mini-computer or mainframe, a programmed microprocessor, a micro-controller, a peripheral integrated circuit element, a CSIC (Customer Specific Integrated Circuit) or ASIC (Application Specific Integrated Circuit) or other integrated circuit, a logic circuit, a digital signal processor, a programmable logic device such as a FPGA, PLD, PLA or PAL, or any other device or arrangement of devices that is capable of implementing the steps of the processes disclosed herein.

The processing machine used to implement embodiments may utilize a suitable operating system.

It is appreciated that in order to practice the method of the embodiments as described above, it is not necessary that the processors and/or the memories of the processing machine be physically located in the same geographical place. That is, each of the processors and the memories used by the processing machine may be located in geographically distinct locations and connected so as to communicate in any suitable manner. Additionally, it is appreciated that each of the processor and/or the memory may be composed of different physical pieces of equipment. Accordingly, it is not necessary that the processor be one single piece of equipment in one location and that the memory be another single piece of equipment in another location. That is, it is contemplated that the processor may be two pieces of equipment in two different physical locations. The two distinct pieces of equipment may be connected in any suitable manner. Additionally, the memory may include two or more portions of memory in two or more physical locations.

To explain further, processing, as described above, is performed by various components and various memories. However, it is appreciated that the processing performed by two distinct components as described above, in accordance with a further embodiment, may be performed by a single component. Further, the processing performed by one distinct component as described above may be performed by two distinct components.

In a similar manner, the memory storage performed by two distinct memory portions as described above, in accordance with a further embodiment, may be performed by a single memory portion. Further, the memory storage performed by one distinct memory portion as described above may be performed by two memory portions.

Further, various technologies may be used to provide communication between the various processors and/or memories, as well as to allow the processors and/or the memories to communicate with any other entity; i.e., so as to obtain further instructions or to access and use remote memory stores, for example. Such technologies used to provide such communication might include a network, the Internet, Intranet, Extranet, LAN, an Ethernet, wireless communication via cell tower or satellite, or any client server system that provides communication, for example. Such communications technologies may use any suitable protocol such as TCP/IP, UDP, or OSI, for example.

As described above, a set of instructions may be used in the processing of embodiments. The set of instructions may be in the form of a program or software. The software may be in the form of system software or application software, for example. The software might also be in the form of a collection of separate programs, a program module within a larger program, or a portion of a program module, for example. The software used might also include modular programming in the form of object oriented programming The software tells the processing machine what to do with the data being processed.

Further, it is appreciated that the instructions or set of instructions used in the implementation and operation of embodiments may be in a suitable form such that the processing machine may read the instructions. For example, the instructions that form a program may be in the form of a suitable programming language, which is converted to machine language or object code to allow the processor or processors to read the instructions. That is, written lines of programming code or source code, in a particular programming language, are converted to machine language using a compiler, assembler or interpreter. The machine language is binary coded machine instructions that are specific to a particular type of processing machine, i.e., to a particular type of computer, for example. The computer understands the machine language.

Any suitable programming language may be used in accordance with the various embodiments. Also, the instructions and/or data used in the practice of embodiments may utilize any compression or encryption technique or algorithm, as may be desired. An encryption module might be used to encrypt data. Further, files or other data may be decrypted using a suitable decryption module, for example.

As described above, the embodiments may illustratively be embodied in the form of a processing machine, including a computer or computer system, for example, that includes at least one memory. It is to be appreciated that the set of instructions, i.e., the software for example, that enables the computer operating system to perform the operations described above may be contained on any of a wide variety of media or medium, as desired. Further, the data that is processed by the set of instructions might also be contained on any of a wide variety of media or medium. That is, the particular medium, i.e., the memory in the processing machine, utilized to hold the set of instructions and/or the data used in embodiments may take on any of a variety of physical forms or transmissions, for example. Illustratively, the medium may be in the form of paper, paper transparencies, a compact disk, a DVD, an integrated circuit, a hard disk, a floppy disk, an optical disk, a magnetic tape, a RAM, a ROM, a PROM, an EPROM, a wire, a cable, a fiber, a communications channel, a satellite transmission, a memory card, a SIM card, or other remote transmission, as well as any other medium or source of data that may be read by the processors.

Further, the memory or memories used in the processing machine that implements embodiments may be in any of a wide variety of forms to allow the memory to hold instructions, data, or other information, as is desired. Thus, the memory might be in the form of a database to hold data. The database might use any desired arrangement of files such as a flat file arrangement or a relational database arrangement, for example.

In the systems and methods, a variety of "user interfaces" may be utilized to allow a user to interface with the processing machine or machines that are used to implement embodiments. As used herein, a user interface includes any hardware, software, or combination of hardware and software used by the processing machine that allows a user to interact with the processing machine. A user interface may be in the form of a dialogue screen for example. A user interface may also include any of a mouse, touch screen, keyboard, keypad, voice reader, voice recognizer, dialogue screen, menu box, list, checkbox, toggle switch, a pushbutton or any other device that allows a user to receive information regarding the operation of the processing machine as it processes a set of instructions and/or provides the processing machine with information. Accordingly, the user interface is any device that provides communication between a user and a processing machine. The information provided by the user to the processing machine through the user interface may be in the form of a command, a selection of data, or some other input, for example.

As discussed above, a user interface is utilized by the processing machine that performs a set of instructions such that the processing machine processes data for a user. The user interface is typically used by the processing machine for interacting with a user either to convey information or receive information from the user. However, it should be appreciated that in accordance with some embodiments of the system and method, it is not necessary that a human user actually interact with a user interface used by the processing machine. Rather, it is also contemplated that the user interface might interact, i.e., convey and receive information, with another processing machine, rather than a human user. Accordingly, the other processing machine might be characterized as a user. Further, it is contemplated that a user interface utilized in the system and method may interact partially with another processing machine or processing machines, while also interacting partially with a human user.

It will be readily understood by those persons skilled in the art that embodiments are susceptible to broad utility and application. Many embodiments and adaptations of the present invention other than those herein described, as well as many variations, modifications and equivalent arrangements, will be apparent from or reasonably suggested by the foregoing description thereof, without departing from the substance or scope.

Accordingly, while embodiments present invention has been described here in detail in relation to its exemplary embodiments, it is to be understood that this disclosure is only illustrative and exemplary of the present invention and is made to provide an enabling disclosure of the invention. Accordingly, the foregoing disclosure is not intended to be construed or to limit the present invention or otherwise to exclude any other such embodiments, adaptations, variations, modifications or equivalent arrangements.

What is claimed is:

1. A method for moving, reconciling, and aggregating data from mainframe computers to hybrid cloud, comprising:
   receiving, by a mainframe computer program executed by a mainframe computer, a trigger event;
   generating, by the mainframe computer program, a message comprising data from one of a plurality of logical partitions in the mainframe computer program;
   loading, by the mainframe computer program, the message to a message log database;
   sending, by the mainframe computer program, the message to a cloud-based target database by making an asynchronous call with the message to a messaging service, wherein a cloud-based listener receives the message from the messaging service and writes the data from the message to the cloud-based target database;
   receiving, by a message purge/retransmission service computer program executed by the mainframe computer program, an acknowledgement message that the data in the message was successfully written to the cloud-based target database; and
   purging, by the message purge/retransmission service computer program, the message from the message log database.

2. The method of claim 1, wherein the trigger event comprises an event trigger, a replication/real-time trigger, or a batch trigger.

3. The method of claim 1, wherein the message further comprises a message creation timestamp, and the message purge/retransmission service computer program purges the message with the message creation timestamp from the message log database.

4. The method of claim 1, wherein the message comprises a JSON message or a Kafka message.

5. A method for moving, reconciling, and aggregating data from mainframe computers to hybrid cloud, comprising:
   receiving, by a mainframe computer program executed by a mainframe computer, a trigger event;
   generating, by the mainframe computer program, a message comprising data from one of a plurality of logical partitions in the mainframe computer program;
   loading, by the mainframe computer program, the message to a message log database;
   sending, by the mainframe computer program, the message to a cloud-based target database by making an asynchronous call with the message to a messaging service, wherein a cloud-based listener receives the message from the messaging service and writes the data from the message to the cloud-based target database;
   receiving, by a message purge/retransmission service computer program executed by the mainframe computer program, a message that the data in the message was not successfully written to the cloud-based target database, or after the message purge/retransmission service computer program detects passage of a predetermined amount of time; and
   triggering, by the message purge/retransmission service computer program, the logical partition to resend the message.

6. The method of claim 5, wherein the trigger event comprises an event trigger, a replication/real-time trigger, or a batch trigger.

7. The method of claim 5, wherein the message further comprises a message creation timestamp, and the message purge/retransmission service computer program purges the message with the message creation timestamp from the message log database.

8. The method of claim 5, wherein the message comprises a JSON message or a Kafka message.

9. The method of claim 5, wherein the mainframe computer program triggers the logical partition to resend the message.

10. A method for moving, reconciling, and aggregating data from mainframe computers to hybrid cloud, comprising:
receiving, by a mainframe computer program executed by a mainframe computer, a trigger event;
generating, by the mainframe computer program, a message comprising data from one of a plurality of logical partitions in the mainframe computer program;
receiving, by the mainframe computer program, a sequential identifier for the message, wherein the sequential identifier identifies a sequence of the message in a plurality of messages;
loading, by the mainframe computer program, the message with the sequential identifier to a message log database;
sending, by the mainframe computer program, the message and the sequential identifier to a cloud-based target database by making an asynchronous call with the message to a messaging service, wherein a cloud-based listener receives the message from the messaging service and writes the data from the message to the cloud-based target database;
determining, by the cloud-based listener and based on the sequential identifier, that a prior message is missing and informing, by the cloud-based listener, that the prior message is missing; and
triggering, by a message purge/retransmission service computer program, the logical partition to resend the message.

11. The method of claim 10, wherein the trigger event comprises an event trigger, a replication/real-time trigger, or a batch trigger.

12. The method of claim 10, wherein the sequential identifier comprises a sequential hash key.

13. The method of claim 10, wherein the sequential identifier comprises an identifier for the logical partition.

14. The method of claim 10, wherein the sequential identifier comprises a portion of the data.

15. The method of claim 10, wherein the cloud-based listener determines that a prior message is missing by polling the target database for sequential identifiers for successfully written messages and identifying a missing sequential identifier.

16. The method of claim 10, wherein the cloud-based listener determines that a prior message is missing by retrieving a last successfully stored message and determining that a sequential identifier for the last successfully stored message is not sequential with the sequential identifier for the message.

17. The method of claim 16, wherein the last successfully stored message is updated with each successfully stored message.

18. The method of claim 10, wherein the message comprises a JSON message or a Kafka message.

19. The method of claim 10, wherein the mainframe computer program triggers the logical partition to resend the message.

* * * * *